United States Patent
Shaw

[15] 3,680,401
[45] Aug. 1, 1972

[54] COORDINATE TABLE
[72] Inventor: Brian Herbert Shaw, Hove, England
[73] Assignee: International Standard Electric Corporation, New York, N.Y.
[22] Filed: May 7, 1970
[21] Appl. No.: 35,367

[30] Foreign Application Priority Data
May 13, 1969 Great Britain.............24,412/69

[52] U.S. Cl. ..................................74/89.15, 33/1 M
[51] Int. Cl..............................................F16h 27/02
[58] Field of Search..74/89.15, 459; 33/1 M, 174 TA

[56] References Cited
UNITED STATES PATENTS

| | | | |
|---|---|---|---|
| 3,495,519 | 2/1970 | Alfsen et al. | 33/1 M |
| 2,508,281 | 5/1950 | Miller et al. | 74/459 |
| 3,241,243 | 3/1966 | Speer | 33/1 M |
| 3,529,481 | 9/1970 | Budzyn | 33/1 M |

*Primary Examiner*—William F. O'Dea
*Assistant Examiner*—Wesley S. Ratliff, Jr.
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An X-Y coordinate table wherein straight line motion is provided by a frame member which is coupled to the top of said coordinate table via linkages in such a manner that any circular arc motion of the table top is compensated for by an opposite circular arc motion of the frame member.

3 Claims, 2 Drawing Figures

Inventor
BRIAN HERBERT SHAW
By Hubert Stern
Attorney

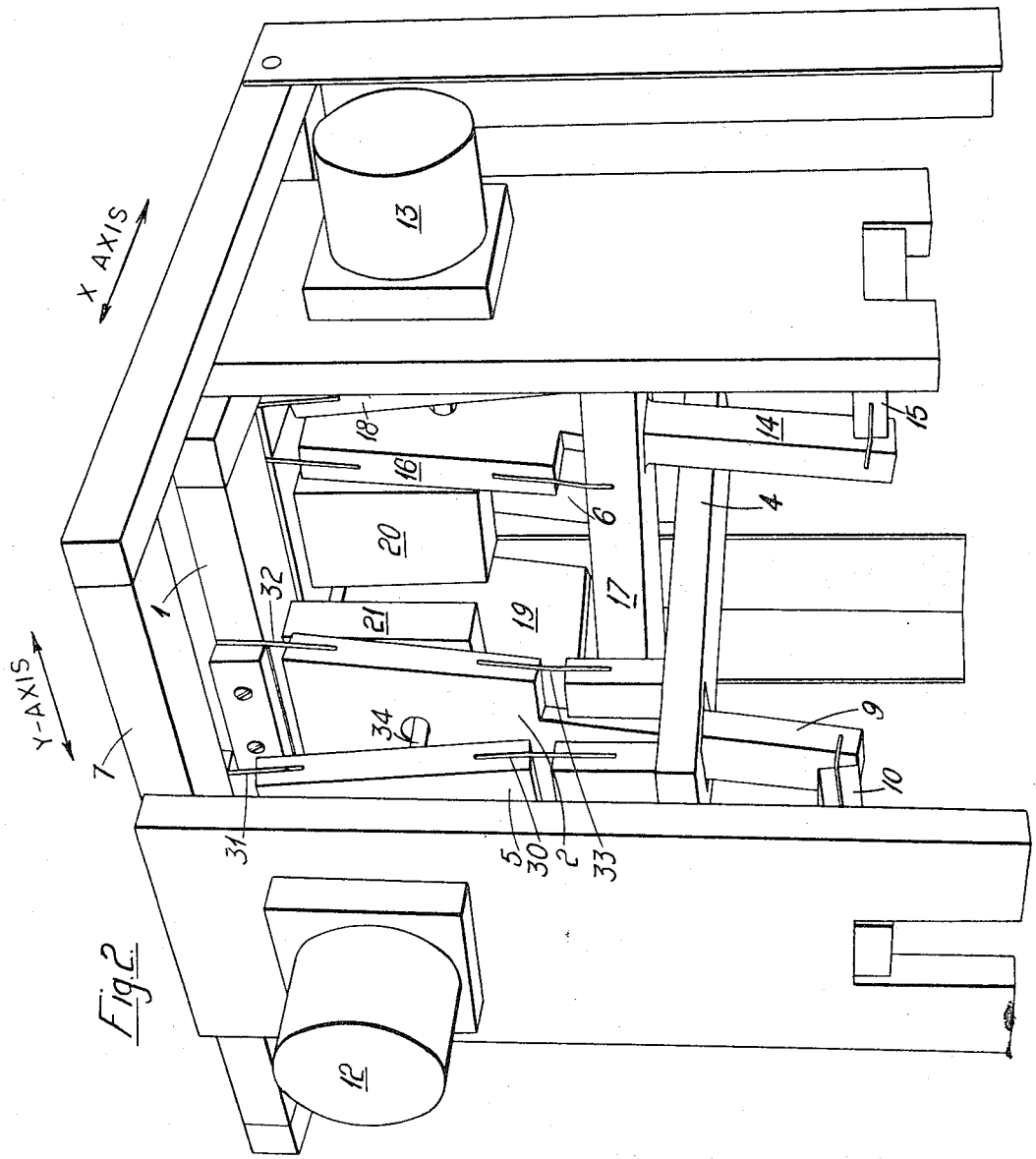

COORDINATE TABLE

BACKGROUND OF THE INVENTION

This invention relates to an X-Y coordinate table and, more particularly, to such a table having extreme accuracy of straight line motion and freedom from backlash and friction.

X-Y coordinate tables presently known in the art often have the disadvantage that the table top motion describes a circular arc due to the mode of linkage connections made. A further disadvantage of prior art systems is that they are relatively inaccurate due to backlash and friction between the linkages and the member to be moved.

SUMMARY OF THE INVENTION

Therefore, the main object of this invention is to provide an X-Y coordinate table which is relatively free from backlash and friction.

It is a further object of this invention to provide such a coordinate table which has substantially level straight line movement.

According to the present invention there is provided an X-Y coordinate table having table member movable in two orthogonal straight line movements, wherein the apparatus provided for each straight line movement comprises a rigid frame, a first plurality of links coupling a first movable member to said rigid frame, a second plurality of links coupling said movable table member to said first movable member, and an extension link equal in length to one of said second plurAlity of links coupled to one end of said one link, and a third link coupling the other end of said one link to said rigid frame, said extension link and said third link being slave links for constraining the movement of said first movable member.

Further objects and features of this invention will become more apparent by reference to the following description taken in conjunction with accompanying drawings in which:

BRIEF DESCRIPTION OF THE DRAWINGS

FIG. 2 illustrates a perspective view of a coordinate table with X and Y axis movement.

DESCRIPTION OF THE PREFERRED EMBODIMENT

Figure 1:
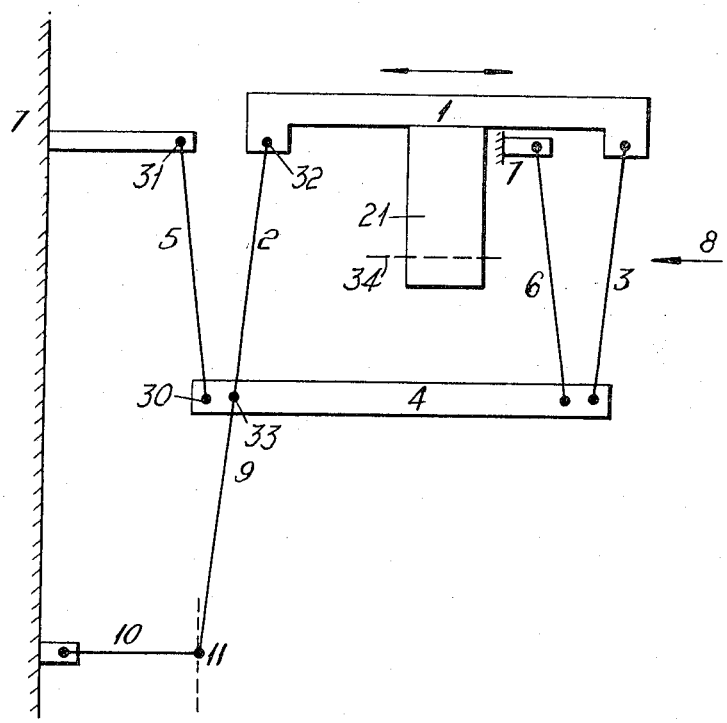
FIG. 1 is a schematic diagram of a preferred embodiment of the invention illustrating the linkages utilized in X-axis motion.

The X-Y movement of the coordinate table shown in FIG. 2 is constructed from two straight line movements combined at right angles to each other. One such straight line movement will now be described with reference to FIG. 1.

Member 1 is a portion of the table which is required to have straight line movement in the directions indicated. It is supported by rigid links 2 and 3 and a second movable member 4, which is in turn supported by rigid links 5 and 6 on a fixed frame 7. The rigid links 5,2, 6, and 3 each may have four flexure bearings (e.g.30–33 shown in FIG. 2), one at each corner of the links and forming an approximate square if viewed from 8 in FIG. 1.

If the movement of member 1 is to be accurately confined to a straight line, member 4 must be constrained or slaved to move by half the amount of movement of member 1. This constraint is provided by slave links 9 and 10. Link 9 is a rigid extension of link 2 and the lengths of links 2 and 9 are equal. Point 11 is fixed relative to the fixed frame 7 in the horizontal plane, but is free to move slightly in the vertical plane. Ideally the locus of point 11 should be a vertical straight line, but it can be shown that with the very small movements involved, the arc due to the link 10 introduces errors in the movements of 4 and 1 which are too small to be detected even in the highest accuracy systems.

In a preferred embodiment of the coordinate table, member 1 moves a total of two inches, i.e., 1 inch either side of the position with the links 2 and 3 vertical, and 4 is, therefore, constrained to move half an inch either side of this position. Member 1 is driven linearly (back and forth along the direction of the X axis) by a preloaded ball leadscrew and nut arrangement coupled to a drive motor, as shown schematically by shaft 34, and acting on fixed extension 21 of 1, and midway between 1 and 4 for maximum stability. The bearings used are preferably flexure pivots and have no separate parts, do not suffer from backlash or friction, and have great rigidity in all directions other than rotation.

As previously stated, two straight line movements, one such movement being shown in FIG. 1, are combined to form the coordinate table. In FIG. 2, if FIG. 1 is taken as representing the outer system (X-axis) some of the parts can be identified by the corresponding numbers. For the sake of convenience, the bearings in FIG. 2 are shown as metallic flexure strips. For example, two of link 5's four flexure bearings are indicated at 30 and 31 and two of rigid link 2's four flexure bearings are indicated at 32 and 33. The motors are represented by 12 and 13 in the X and Y axis respectively. The Y-axis system is also mounted to member 1 with the drive system thereof coupled to fixed extension 20 of member 1, not unlike the drive system arrangement associated with the X axis as above described.

The Y axis system, in fact is identical to the X axis system and as to the components thereof shown in FIG. 2, 13 corresponds to 12 in the X axis, 14 corresponds to 9, 15 corresponds to 10, 16 corresponds to 2, 17 corresponds to 4, 18 corresponds to 5, 19 corresponds to 6, and 20 and 21 are the extensions respective fixed of 1 which are operatively coupled to the drive means 13 and 12 respectively, for Y and X axis movement respectively.

The coordinate table is further provided with means (not shown) for accurately aligning the two axes at right angles.

It is to be understood that the foregoing description of this invention is made by way of example only and is not to be considered as a limitation on its scope.

I claim:

1. An X-Y coordinate table having a table member movable in two orthogonal straight line movements, wherein the apparatus provided for each straight line movement comprises:
   a rigid frame;
   a first movable member;

a first plurality of links coupling said first movable member to said rigid frame;

a second plurality of links coupling said movable table member to said first movable member;

an extension link equal in length to one of said second plurality of links coupled to one end of said one link; and a third link coupling the other end of said one link to said rigid frame, said extension link and said third link being slave links for constraining the movement of said first movable member.

2. An X-Y coordinate table, according to claim 1, wherein said links are coupled to said members by flexure bearings.

3. An X-Y coordinate table according to claim 2 further including:

a pair of extensions from said table member, one for X-axis movement and the other for Y-axis movement; and a pair of independent driving means, one each for X-axis and Y-axis movement, said driving means acting on the respective extensions at a position on said extension midway between said table member and said first movable member.

* * * * *